United States Patent [19]

Bhargava

[11] Patent Number: 5,422,907
[45] Date of Patent: Jun. 6, 1995

[54] PUMPED SOLID-STATE LASERS COMPRISING DOPED NANOCRYSTAL PHOSPHORS

[76] Inventor: Rameshwar N. Bhargava, 5 Morningside Ct., Ossining, N.Y. 10562

[21] Appl. No.: 246,944

[22] Filed: May 20, 1994

[51] Int. Cl.$^6$ ............................................. H01S 3/14
[52] U.S. Cl. .................................. 372/68; 372/70; 372/74; 372/39
[58] Field of Search ................. 372/68, 70, 39, 41, 372/74

[56] References Cited

U.S. PATENT DOCUMENTS 5,038,358  8/1991  Rand ........................................ 372/41
5,287,373  2/1994  Rapoport et al. ...................... 372/39

Primary Examiner—Léon Scott, Jr.

[57] ABSTRACT

An optically-pumped or electron-beam-pumped solid-state laser employing as the phosphor material doped nanocrystal particles which as a result of quantum confinement can be caused to exhibit discrete levels in its conduction band that can overlap with the corresponding levels in the doping activator such that resonant energy transfer of excited carriers from the conduction band of the phosphor host to that of the activator will occur. The energy levels in the activator are such as to allow very fast carrier transitions to an intermediate level and a slower radiative transition to a ground state. The result is an energy level structure similar to that of a four-level laser but capable of more efficient conversion of the pumping energy to photon generation.

28 Claims, 7 Drawing Sheets

RECOMBINATION KINETICS IN DOPED NANOCRYSTALS

PUMPED SOLID-STATE LASERS COMPRISING DOPED NANOCRYSTAL PHOSPHORS

RELATED APPLICATIONS

Commonly-owned, application, Ser. No. 08/185,191, filed Jan. 24, 1994, entitled "Light-Emitting Device".

Commonly-owned, application, Ser. No. 08/225,613, filed Apr. 11, 1994, entitled "Displays Comprising Doped Nanocrystal Phosphors".

BACKGROUND OF THE INVENTION

This invention relates to optically- and electron-beam-pumped solid-state lasers.

The basic problem impeding the efficient operation of optically-pumped solid-state lasers is that the typical solid-state laser materials consist of a wide bandgap insulating host material doped with optically active impurity atoms. The impurities are typically either rare-earth ions ($Nd^{3+}$, $Er^{3+}$) or the transition metals ions ($Cr^{3+}$, $Ti^{3+}$). The absorption spectrum of such ions is characterized by the lines associated with the transitions between the shielded (and thus narrow) f or d atomic levels. However, most of the pump sources for such lasers, such as high pressure gas discharge or incandescent lamps, are characterized by their extremely wide emission spectrum. Therefore, only a small percentage of the pumped light is actually absorbed by the laser material. For a small diameter laser rod, this is typically less than 10%. As a result, the flashlamp pumped solid-state laser usually requires a bulky power supply and a water cooled system. Besides inefficiency, this renders the laser system useless for applications where portability is a key requirement.

In recent years, the laser diode has emerged as a promising alternative to flashlamp pumping of solid-state lasers. The high pumping efficiency, compared to flashlamps, stems from the better spectral match between the laser-diode emission and the rare-earth absorption bands. As a result, the thermal load on both the laser rod and the pump is reduced. The system weight and power consumption are also substantially reduced with increased reliability. However, the cost of the diode laser arrays makes it expensive. In addition, the laser diodes require high current power supplies that are usually heavy rendering the lasers impractical for airborne and space applications. Therefore, scientists have been trying to harness an alternative energy pump source, the most efficient of which is solar energy.

Considerable research has been done on solar-pumped solid-state lasers such as Nd:glass [1], Nd:CaWO4 [2] and Nd:YAG [3]. [Bracketed reference numbers are identified in the annexed Appendix]. In the latter case, a solar pumped Nd:Yag laser has produced up to 5 W of continuous wave (CW) output power. The basic geometry of the solar-pumped laser consists of a Cassegranian telescope to collect the solar radiation and suitable optics to concentrate the pumped light onto the face of the end-pumped laser rod [3]. More recently, some non-imaging solar concentrators have been proposed.

Typically, the diameter of the collecting optics must exceed 1 m in order to achieve the lasing threshold. This fact severely limits the performance of the solid-state lasers in those applications where the size of the payload is crucial. The underlying reason for such a "hunger" for the sunlight, is the same one that limits the performance of the flashlamp-pumped lasers; the mismatch between the line absorption spectrum of the laser material and the continuous emission spectrum of the pump source—the sun. Numerous attempts to enhance the transfer of the pump source radiation to the laser emission have succeeded in the development of the so-called "sensitized" lasers, such as Cr:Nd:GSGG [4]. In this material, the $Nd^{3+}$ is the active ion and the $Cr^{3+}$ is a "sensitizer", which has a large absorption band over a wide spectral range. The excitation absorbed by the broad $Cr^{3+}$ absorption bands is transferred to the $Nd^{3+}$ ions. This process is reasonably efficient in the GSGG host, but this is a rare coincidence. In many other hosts, like YAG, the energy transfer is quite inefficient, since transitions between the "sensitizer" and active ion is spin forbidden. Given the difficulties encountered in the production of GSGG, this scheme has not found many applications.

SUMMARY OF THE INVENTION

An object of the invention is an improved pumped, solid-state laser device.

Another object of the invention is a solid-state optically-pumped laser having a small, efficient, and inexpensive pump source.

A further object of the invention is an improved solar-pumped, solid-state laser.

The invention is based upon the following new understandings and discoveries.

Since the typical host crystal absorbs all the above bandgap radiation efficiently, why not use the broadband absorption of the host material to absorb the pumped light from the sun or other source, and then transfer the thus photo-generated electrons to the active ions? There are two reasons why this cannot be done in the present state of the art. First, the radiation with energy more than a few hundred meV above the bandgap will be absorbed in a thin layer ($\sim 100$ Å) near the surface of the host material. The photoexcited carriers will recombine non-radiatively at the surface. This problem also exists for the designers of solar cells. In addition to the effect of the surface recombination, the broadband excitation, which is distributed non-uniformly in the laser rod, negatively affects the spatial characteristics of the laser emission and prevents stable laser operation.

More importantly, a second reason working against the scheme of pumping the laser via the band-to-band absorption of the host material, is the absence of an efficient energy transfer mechanism between the host material and the active ions. The reason for the low efficiency, in the most simple yet instructive description, is that the electrons and holes in the host material are not localized. Their wavefunctions are spread out over a range comparable to the excitonic Bohr radius of the material, $a_B$ ($\sim 100$ Å in semiconductors). On the other hand, the optically-active electron of the dopant ion belonging to the shielded f (rare earth) or d (transition metals) shell, is localized in a radius of only a few angstroms. Thus, the overlap of the wave functions between the host and donor is small, and thus the probability of transition between them is much smaller than the probability of recombination.

A more detailed study has revealed that, in the vicinity of the dopant atom, the wave function of the electron in the conduction band has an s-orbital shape and the wave function of the hole in the valence band has a p-orbital shape. Since the impurity electron has a d- orbital or f-orbital shape, some of the transitions are prohibited by symmetry considerations.

However, in accordance with a first aspect of the invention, when the dimensions of the host crystal are less than $a_B$, the properties of the host-activator system undergo dramatic changes that alleviate the above problems. These include:

1. The bandgap of the host material increases as a result of the confinement established by the reduced crystalline dimensions. By varying the characteristic dimension of the confinement, it becomes feasible to effectively change the bandgap energy. This will allow a structure in which the bandgap can be varied as a function of its particle size. The different sized particles can be distributed along a direction normal to the surface of the structure—the larger sized particles further from the surface, the narrower will be the bandgap. In such a structure, the absorption spectrum can be substantially matched to the spectrum of the pumping radiation, such as the sun, and the sunlight will be absorbed uniformly throughout the thickness of the laser structure: the longer wavelengths near the surface and the shorter wavelengths further inside.
2. The carriers in the host material become localized within a short distance from the impurity atoms.
3. Prompted by the confinement, the shapes of the wavefunctions of both host and impurity lose their atomic-like "purity" and mix with each other—the so-called hybridization takes place [11].

Now, when the interacting particles are located close to each other and have similar orbital shapes, the probability of their interaction will be increased dramatically. This increase has been observed experimentally [5].

Furthermore, the strength of the atomic radiative transition can be increased many-fold by the hybridization [5–7]. When the probability of the excitation transfer and subsequent atomic emission exceeds the probability of bandedge recombination, the energy transfer efficiency increases and one can achieve gain and stimulated emission at the wavelength of the impurity atom.

In accordance with another aspect of the present invention, the processes described above have been found to occur in doped nanocrystals (DNC).

In accordance with a further aspect of the present invention, an optically-pumped or electron-beam-pumped, solid-state laser comprises an active layer comprising doped nanocrystals (DNC). By "DNC" is meant quantum-confined, separated, tiny, luminescent particles with nanometer dimensions, typically 100 Å or less in size, of certain luminescent materials activated with certain activators, which, when excited, will efficiently emit radiation characteristic of the activator. Since the luminescent particles are very small, a layer that is several of such particles thick can be made very thin, of the order of 1000 Å or less.

In accordance with a preferred aspect of the present invention, DNC phosphor layers as the active layer of a laser are prepared of doped nanocrystalline 2 to 5 nm particles of insulating and solid-state lasing materials. A preferred group is wide bandgap II–VI semiconductors and insulators prepared by room temperature chemistry. Examples of suitable host materials include members of the II–VI family of compounds, such as ZnO, ZnS, ZnSe, CdS, CdSe, and insulating metal oxides such as yttrium oxide and yttrium oxysulphide. Examples of suitable activators include the rare earth ions and the transition metal ions. For example, DNC powder of $ZnS:Mn^{2+}$ shows characteristic yellow emission of the Mn activator [5]. Besides high efficiency, these doped nanocrystalline particles yield extremely fast luminescent lifetime which is about six orders of magnitude faster than in the bulk phosphors [5]. This demonstrates that in DNC, impurity associated emission can be very efficient and fast due to electron-hole localization at the impurity [4].

In accordance with another aspect of the present invention, considering the host DNC particle as a cage for the dopant ions, by controlling the size of the cage by controlling the size of the DNC particle, it becomes possible to substantially match the excited energy levels for electrons in the host to the corresponding excited atomic energy levels in the ions. When this is achieved, a resonant energy transfer occurs, i.e., the transfer of carriers from host to dopant ions occurs almost instantaneously (within nanoseconds) and efficiently without any loss of energy. In contrast, the radiative decay of carriers in the dopant ions to ground or a lower level occurs in a much longer time frame (typically of the order of microseconds). Thus, the excited carriers have a longer lifetime in the excited levels and thus the basis for population inversion is established and consequent laser action when an optical cavity is provided.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, in which drawings like references denote like or corresponding parts.

DETAILED DESCRIPTION OF THE PREFERRED EMBODIMENTS

DNC phosphors in this laser application will provide ultra-fast and efficient phosphors which may not only be linear but super-linear. Since the DNC phosphos are ultra-fast, they do not show saturation of light output when addressed by an intense electron or optical beam.

Figure 1:
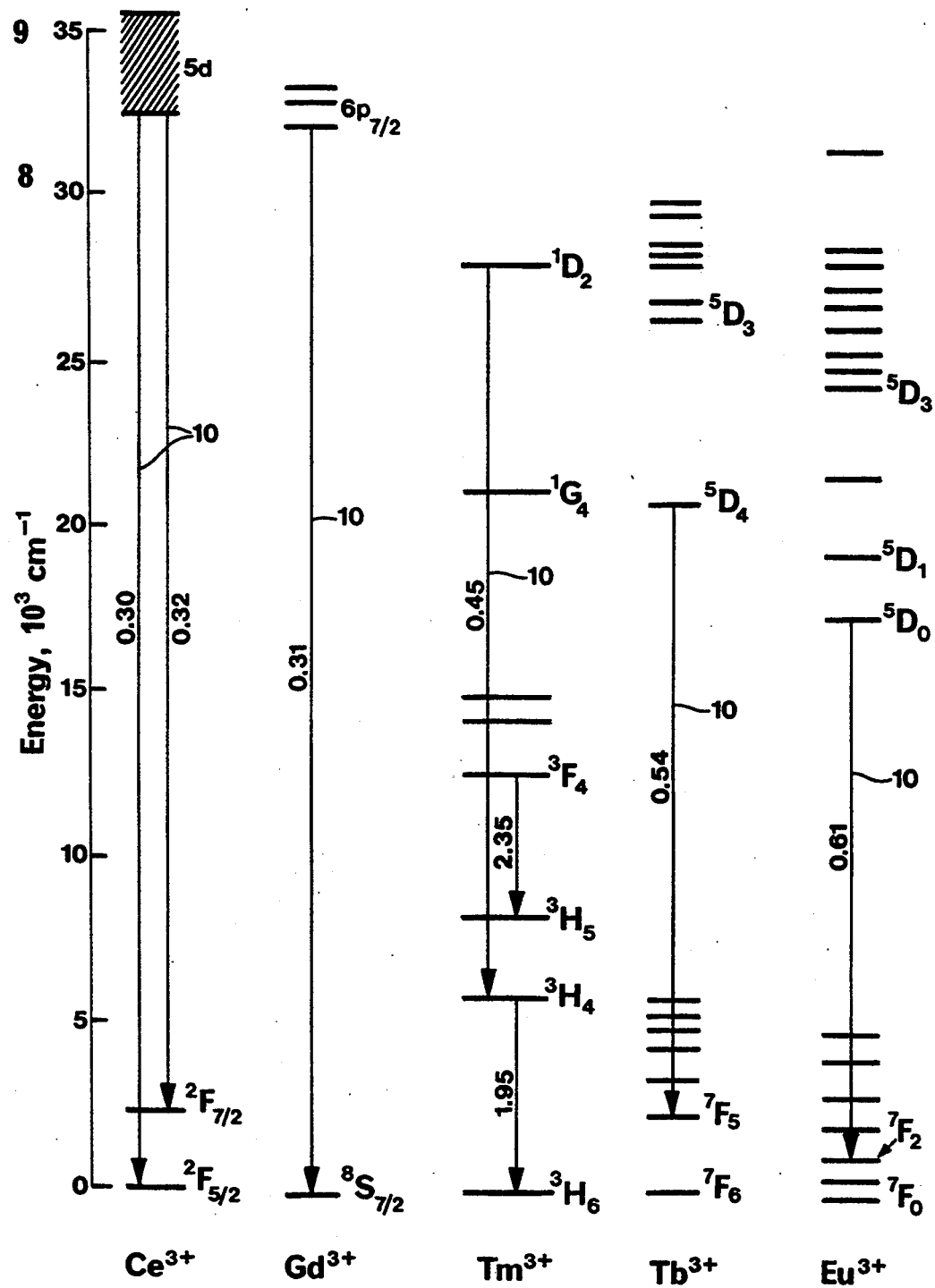
FIG. 1 illustrates band diagrams for five rare-earth dopants for use in DNCs in devices in accordance with the invention, indicating radiative transitions from excited levels.

As the luminescent phosphor in these laser applications, I prefer line emitting phosphors with rare-earth dopants due to their efficiency and narrow spectral distribution for better color purity. The majority of the dopants (also called activators from time to time) incorporated in DNC will be from rare-earth elements. FIG. 1 illustrates band diagrams for five of the rare-earth dopants. The atomic levels are as shown and labelled, and the arrows 10 indicate radiative transitions from excited levels. The energy jump indicates the wavelength of the resultant emitted photons. As shown in FIG. 1, the spectral range extends from UV (Ce, Gd), to blue (Tm), to green (Tb), and to red (Eu). Other rare earth ions such as Ho, Pr, Er and Yb can also be used for longer wave radiation. The transition metal impurities (Mn, Cu) and deep impurities (Ag, Au, etc.) can also be incorporated to obtain broad band emitting DNC phosphors.

To prepare efficient phosphors from DNC, preparation techniques are employed to ensure that, not only are small particles doped with an appropriate activator obtained, but they are also kept separated. As explained in the two related applications, whose contents are incorporated herein by reference, and in the references [5]–[7], whose contents are also incorporated herein by reference, the tiny nanometer particles must remain separated to exhibit the quantum-confined effects described herein. The chemical synthesis of DNC to achieve these results can rely on one of two possible mechanisms to limit the size of the crystallites: (A) the equilibrium size for the new phase (balancing free energy of a precipitated phase against the increased surface energy) is nanocrystalline-homogeneous growth, or (B) the new phase is grown at a low energy nucleation site within another material and the material size is limited by mass transport-heterogeneous growth. There are numerous reaction paths for both of these mechanisms which have been successfully applied, and these are included within the scope of this invention. Several of these techniques are listed below and are described in more detail in the related applications or reference as indicated, whose contents are also incorporated herein by reference:

1. Homogeneous precipitation at equilibrium in solution with reaction volume limited by micelles in solution in a volume limiting matrix (e.g. ion exchange resins, zeolites, porous glasses)([8] and references cited therein).
2. Reaction mediated molecular growth, such as molecular cluster synthesis (organometallic molecules forming inorganic cores) or polymer matrix reactions (e.g. ring-opening metathesis polymerization)([5]–[7] and references cited therein).
3. Heterogeneous growth, such as nucleation and growth of nanocrystalline phase on matrix sites, or diffusional growth by aggregation of chemically stable molecules within a matrix ([12] and references cited therein).

It will be appreciated that there are other publications referenced in the related applications that describe the preparation of undoped nanocrystals, but the same techniques with the modifications described in references [5]–[7] can be used to make the doped nanocrystals used in the invention. For further reducing the laser threshold, the DNC particles can be coated with materials which have a lower refractive index than that of the host and are transparent to the exciting radiation. An alternate possibility is to embed the DNC in a matrix of transparent, lower index material, which will act as a rigid waveguide substrate also.

As will be evident from the foregoing, DNCs is based on chemically preparing doped nanocrystalline particles of sizes preferably in the range of 2 to 5 nm of wide bandgap II–VI semiconductors and insulators using room temperature processing. As one example, which is not to be considered limiting, I have prepared manganese-doped zinc sulfide nanocrystals using mechanism A and technique 1 as follows. Diethylmanganese was synthesized first in a conventional manner and then mixed with diethylzinc in toluene solution. After addition of this solution to a hydrogen sulfide toluene solution, precipitation of the manganese-doped nanocrystals occurred. After centrifugation and subsequent rinsing of the particles, methacrylic acid and poly(methyl methacrylate) were used as surfactants to maintain the separation between the particles for quantum confinement. The surfactants allowed me to coat the surface of the particles and create a barrier for agglomeration and simultaneously provide surface passivation of the nanocrystalline particles. The other activators and hosts mentioned above can be made by similar techniques. This includes the preferred rare-earth dopants for visible light emitters. Thulium, terbium, and europium are the first three elements of choice. Their introduction can be similar to manganese doping in the zinc sulfide system. Other techniques such as the preparation of rare earth doped nanocrystals of ZnS using organometallic synthesis as well as non-aqueous sol-gel processing or a combination of both is also considered within the scope of the invention. To prepare these materials a synthesis of intermediate, metastable compounds may have to be undertaken.

Figure 2:
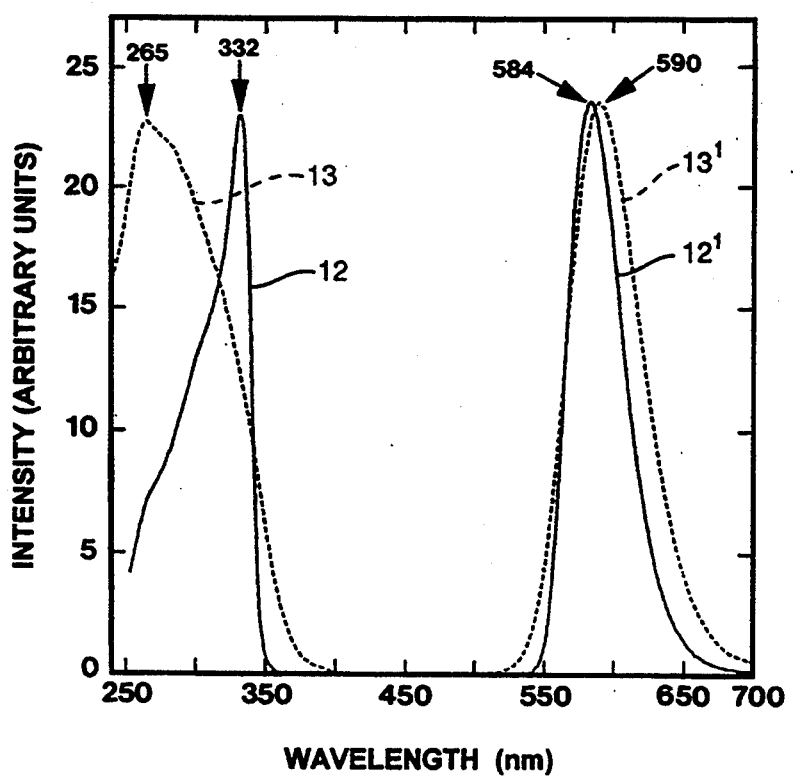
FIG. 2 shows the photoluminescent and photoluminescent excitation spectra and resultant emission spectra at room temperature of Mn-doped ZnS DNCs.
Figure 3:
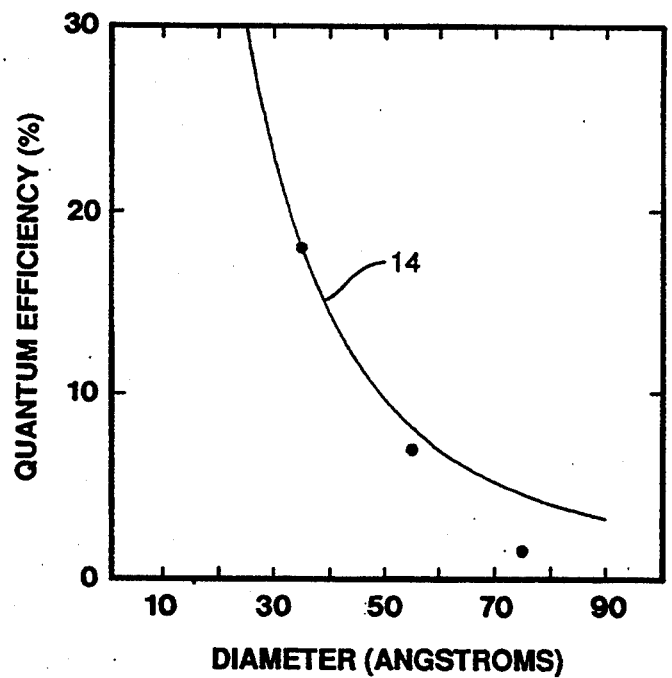
FIG. 3 shows the measured efficiency of the Mn-yellow emission and its strong dependence on the size of the Mn-doped ZnS nanocrystals.
Figure 4:
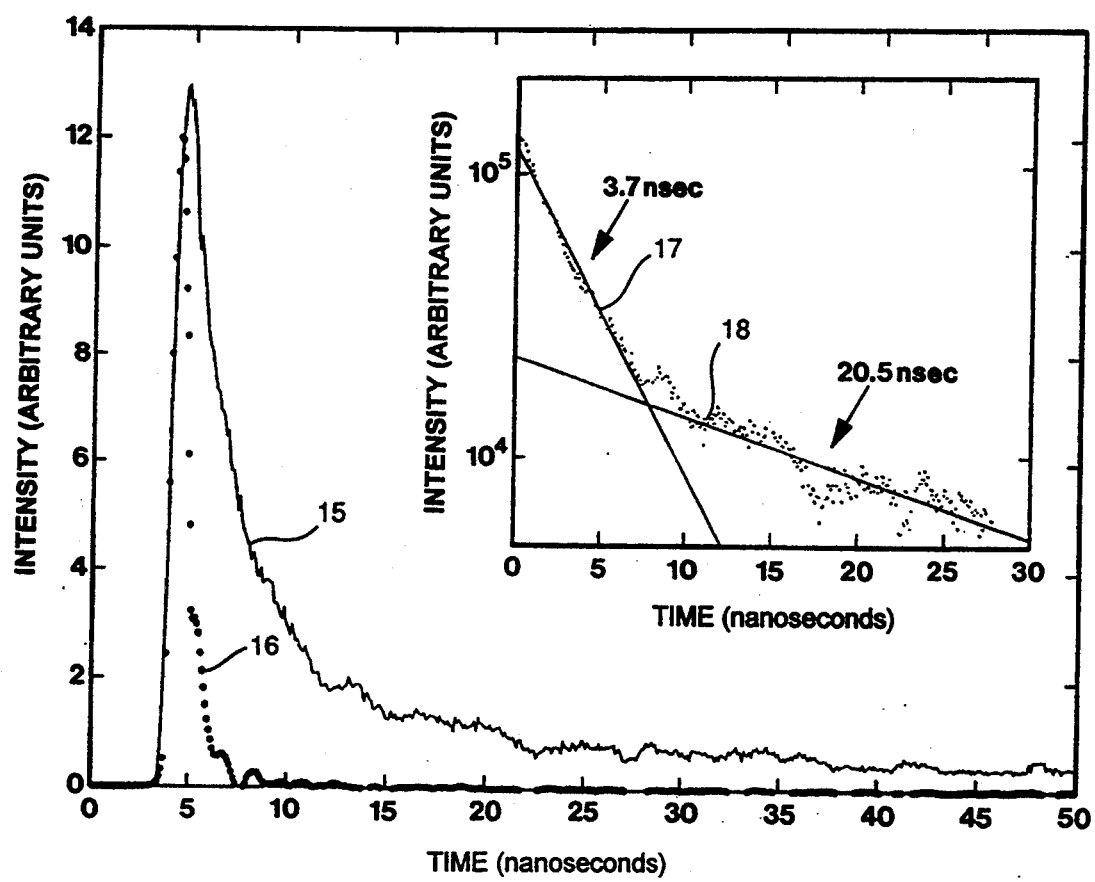
FIG. 4 shows in the main graph the transient yellow luminescence for 30 Å size particles, and its separation into its exponential decay components in the inset graph.
Figure 5:
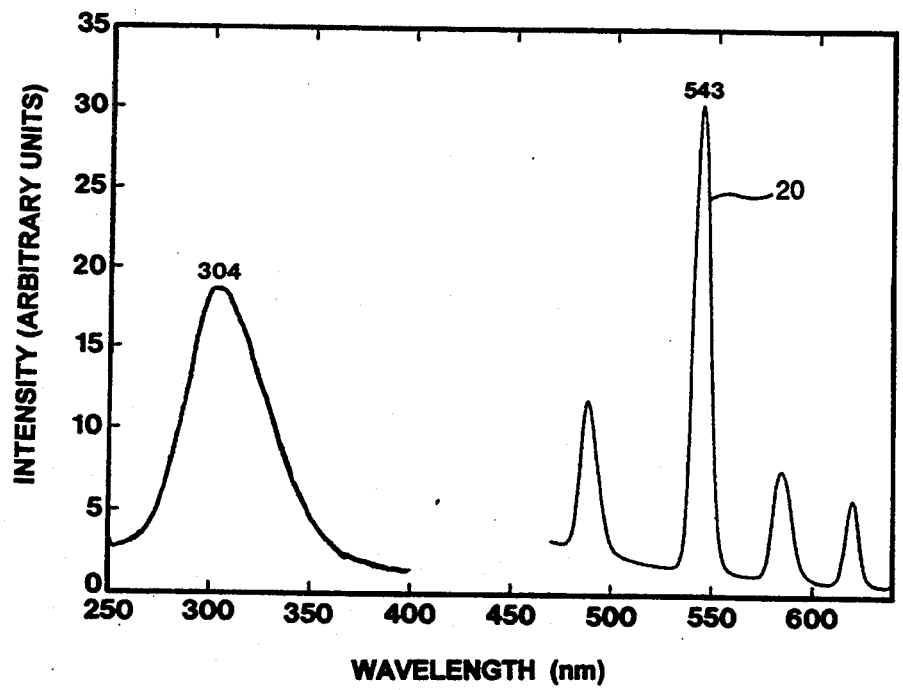
FIG. 5 shows the spectral output of $Tb^{3+}$ (green) in doped nanocrystals of ZnS in a polyethylene oxide matrix.

FIG. 2 shows some of the results obtained in DNC of Mn doped ZnS. FIG. 2 shows the photoluminescent (PL) 12 and photoluminescent excitation (PLE) 13 spectra and resultant emission spectra 12', 13' at room temperature. The spectra establish that the Mn-ion is an integral part of the ZnS nanocrystal. The measured efficiency of the Mn-yellow emission is over 20% at room temperature and strongly depends on the size of the nanocrystals, indicated by the curve 14 in FIG. 3. As the size of the nanocrystals decrease, the probability of electron and hole capture to the impurity increases and the e-h localization enhances the recombination rate via the impurity. Besides, the enhanced transfer rate from the host to the impurity, which has been measured, is less than 20 psec [7]. This is accompanied by simultaneous reduction in the radiative lifetime of Mn-ion emission. In bulk crystalline material, the partially spin-forbidden Mn2+ 4T1-6A1 transition has a lifetime of about 1.8 msec. In DNC produced as described above, I find dramatic shortening of this decay time by about six orders of magnitude. FIG. 4 shows the transient yellow luminescence 15 for 30 A size particles, measured by exciting 16 the host ZnS nanocrystals above the bandgap by a picosecond pulsed laser. The time decay is separated into its exponential decay components 17, 18 in the inset graph. I have also produced $Tb^{3+}$ (green) in doped nanocrystals of ZnS in a polyethylene oxide matrix as shown in FIG. 5 at 20. The shift of the bandgap (332 to 304 nm) as measured from the PLE spectrum corresponds to particles of 60 A size.

These results are important in that:
1) a room temperature processing was used for phosphor preparation,
2) high luminescent efficiency was achieved upon impurity incorporation in these quantum confined nanocrystals,
3) the nanocrystalline phosphors so obtained are six orders of magnitude faster than the corresponding bulk phosphors,
4) the recombination (trapping) time for the free particles is less than 20 picoseconds,
5) these phosphors are characterized by controlled morphology and high purity.

Figure 6:
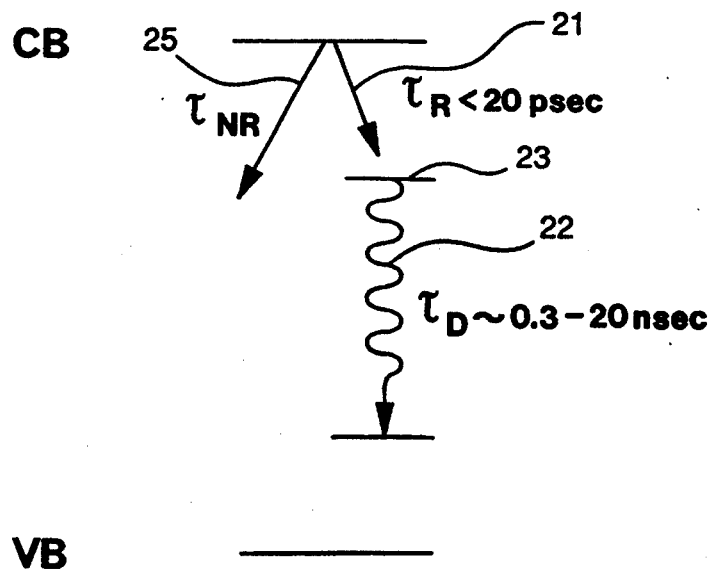
FIG. 6 shows the energy level diagram for a laser in accordance with the invention.
Figure 7:
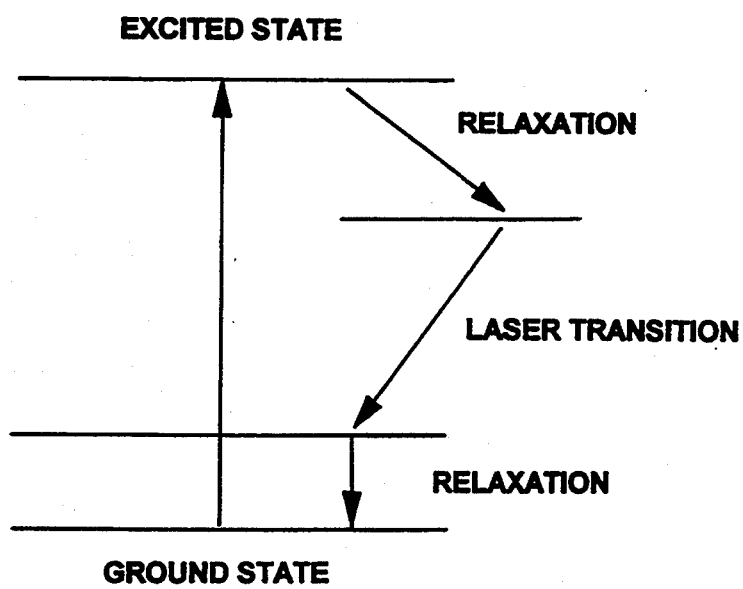
FIG. 7 shows, for comparison purposes, the energy level diagram for a typical 4-level laser.

The recombination model shown in FIG. 6 with measured parameters is similar to a typical four-level laser scheme shown in FIG. 7. In FIG. 6, VB and CB reference the valence and conduction bands of the host energy levels. Electrons excited into the conduction band will decay by a non-radiative transition $t_{NR}$ 25, and a very short (<20 ps) trapping time tR 21 followed by a slower radiative or luminescent decay $t_D$ 22 of approximately 0.3–20 ns to a ground state. The ratio of the trapping time (<20 psec) to luminescent decay time (~4 nsec) is the dominant factor in achieving population inversion in the excited level 23 and gain needed for laser action. In the typical 4-level laser scheme of FIG. 7, the corresponding energy levels have been labelled.

As discussed above and shown in FIG. 4, the lifetime in ZnS:Mn nanocrystals is 3.7 nsec as compared to the bulk lifetime of 1.8 msec. The decay time measurements of the d-electron luminescence is consistent with a strong sp-d electron system in the nanocrystals. Given the high external quantum efficiency of the yellow emission, the extraordinary shortening in the d-electron decay time must include a significant degree of hybridization of the s-p host states with those of the d-electron. It is unlikely that modified crystal fields, given the proximity to a surface in a crystal, can alone be responsible for such admixing. Rather, I believe that the electronic confinement experienced by the s-p states and the corresponding increase in their spatial overlap with the localized d-electron states promotes the process of hybridization. An immediate benefit of the mixing is an enhanced energy transfer (capture) rate of the electron-hole pairs at the d-electron sites. The enhancement of efficiency in Mn doped ZnS nanocrystals is not only a consequence of the faster energy transfer to $Mn^{2+}$ ion but also is connected with the change of the decay rate of Mn emission. The faster decay time as a result of strong sp-d mixing due to localization of electron and hole on $Mn^{2+}$, is necessary for this enhancement. If the lifetime of $Mn^{2+}$ emission remained as long as in the bulk crystal (1.8 msec), faster transfer rate would not result in high efficiency because light output would saturate at very low levels of excitation. The results obtained in ZnS:Mn nanocrystals can be extended to rare-earth doped ZnS nanocrystals, and we also expect the same lifetime changes in the internal transition of the rare-earth impurities. Indeed, in one of the samples of ZnS:Tb the lifetime was observed to be about 7 nsec as compared to ~3 msec in the bulk ZnS:Tb phosphor [6].

The capture/transfer rates of electrons into the rare-earth impurities will produce capture times in the range of 1 to 500 psec.

Figure 8:
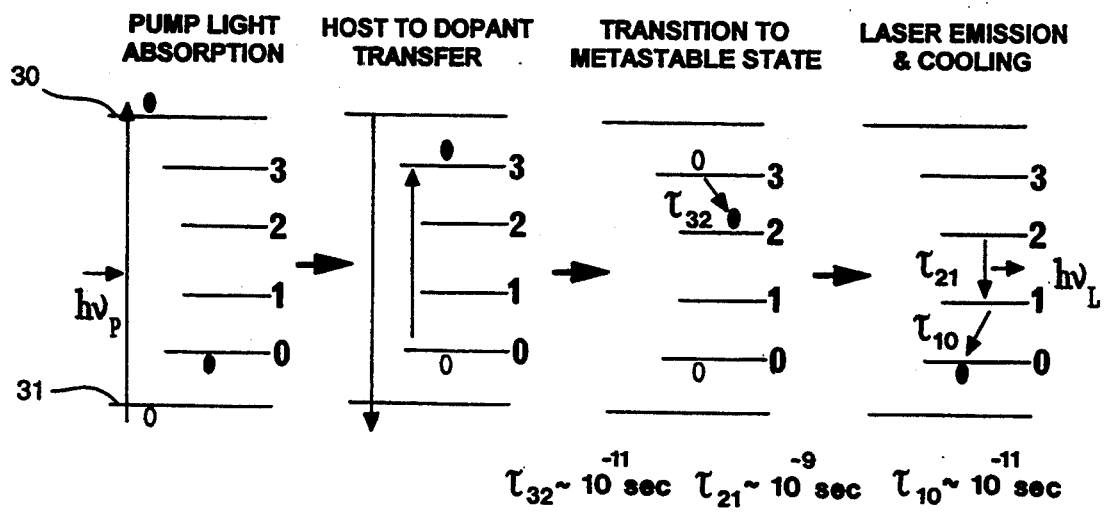
FIG. 8 shows the various energy level transitions during operation of a laser according to the invention.

Considering the simple model of the DNC shown in FIG. 8, there are six relevant energy levels. Two of them belong to the conduction band 30 and the valence band 31 of the host material and the other four (labelled 0,1,2,3) to the atomic levels of the impurity. The transition probability of the energy transfer from the electron-hole pair of the host material in levels 30 and 31 to the excitation of the impurity ion from the ground level (0) to the excited level (3) (in reality, there is more then one level) is defined as $\tau$. The transition between level 3 and the metastable upper laser level (2) occurs on the picosecond scale. Therefore one can assume that all of the excited ions have an electron on level 3. The lasing transition is between levels 2 and 1 and the lifetime of that transition, $t_{21}$, is on the nanosecond scale. The relaxation of electrons from the lower laser level 1 to the ground level takes place on the picosecond scale, thus the lower state population is roughly equal to 0.

The dynamics of the carrier population in the DNC can be described by the following system of equations:

$$\frac{dn_e}{dt} = \frac{MaP}{h\nu} - \frac{n_e}{\tau_r} - Tn_e n_0 \tag{1a}$$

$$\frac{dn_2}{dt} = Tn_e n_0 - \frac{n_2}{\tau_{21}} \tag{1b}$$

$$n_0 + n_2 = N_D \tag{1c}$$

where
ND doping density
n2 population density of the upper level
n0 density of unexcited impurity ions.
ne density of the electron-hole pairs
tr recombination time
P pumping power density
hn bandgap energy of the host material
a absorption coefficient
M magnification of the collecting optical system (assuming solar pumping)

Gain can be evaluated by:

$$g = \sigma_{21} n_2 \tag{2}$$

where s21 is the stimulated emission cross-section. By introducing the energy transfer time:

$$\tau_t = \frac{1}{TN_d} \tag{3}$$

and the saturation pumping power density, $$P_{sat} = \frac{h\nu N_D \left(1 + \frac{\tau_t}{\tau_r}\right)}{\tau_{21} Ma} \tag{4}$$

one can distinguish two regimes:

1) Low density excitation (P<<Psat)

$$g = \frac{\sigma_{21}N_D P}{P_{sat}} = \frac{\sigma_{21}MaPr_{21}}{h\nu\left(1+\frac{\tau_t}{\tau_r}\right)} \quad (5a)$$

2) High density excitation (P>Psat)

$$g = \sigma_{21}N_D \quad (5b)$$

We can estimate the saturation power. For nanocrystals with a diameter of 25-30 Å, assuming that each nanocrystal contains one impurity atom, the doping density ND is about 1020 cm−3. If the absorption coefficient * is equal to 102 cm−1, the quantum efficiency is ~50%, and the bandgap is ~3 eV, the value of saturation power density for the matrix is $$P_{sat} = 10^{18} \frac{W}{cm^2} \frac{\left(1+\frac{\tau_t}{\tau_r}\right)}{M\tau_{21}} cm^{-2} \quad (6)$$

The lifetime of lasing transition have been measured to be of the order of a few tens of nanoseconds, the recombination time is about 1 ns while the energy transfer time is only a few picoseconds. The optical system is capable of increasing the sunlight flux density by a factor of M=1,000. Thus, the saturation power density is of the order of $10^{23}$ photons per square centimeter, and the material actually never gets saturated.

The expected transitions in various rare-earth impurities when incorporated in nanocrystalline ZnS particles is shown in FIG. 1. The arrow designated 8 represents the conduction band for bulk ZnS; that designated 9 the corresponding conduction band for DNC ZnS. The increase in the value of the band gap from bulk ZnS to nanocrystal ZnS is shown for 35 Å particles. By varying the size of the DNC particles, the conduction band edge can be varied about the level designated 9, with larger particles lowering the level and smaller particles raising the level. Resonant energy transfer from a discrete level associated with a particular size nanocrystal particle could thus be enhanced to enhance the transfer probability and improve the efficiency. In effect, the NDC particle size is "tuned" to produce host levels within about 1 kT of energy to that of the activator levels to provide the desired resonant energy transfer. The relationship determining the bandgap of the DNC particles is the bandgap of the bulk material plus a factor proportional to a constant (dependent on the effective mass and dielectric constant of the DNC host material), and inversely proportional to the square of the particle radius. Thus, as the particle radius or size decreases, its bandgap increases.

Figure 9:
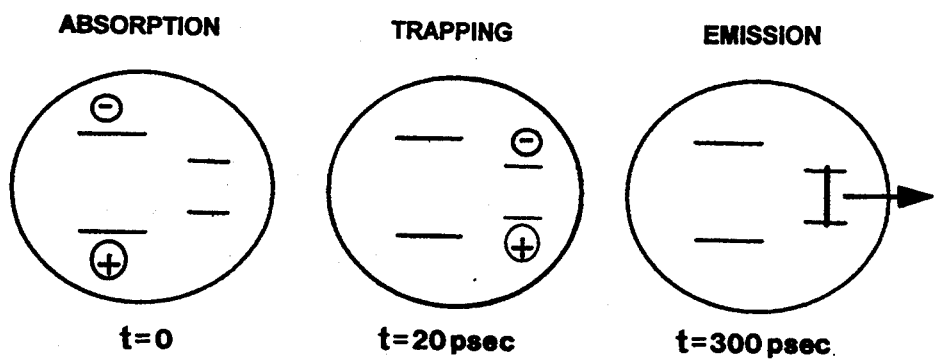
FIG. 9 illustrates schematically the recombination kinetics in doped nanocrystals.

The recombination kinetics in DNC which promotes efficient laser action is also illustrated in FIG. 9. In the left diagram labelled a, electron-hole pairs are produced when the pumping radiation is absorbed by the host crystal; the center diagram labelled b shows the ultra fast transfer to the activator impurity levels and trapping at intermediate levels which can be resonant; the right diagram labelled c shows the laser transition and photon emission.

The external quantum efficiency of 18% achieved in ZnS:Mn nanocrystals (Mn concentration approximately 0.5%), accompanied by a shortening of radiative lifetime by several orders of magnitude [5], suggests that the quantum confinement is of great importance in achieving high efficiency and ultra-fast phosphors.

These results become more astounding for two reasons: First, the doped nanocrystals have an efficiency comparable to the bulk, yet they have been processed at room temperature, while the bulk samples are annealed at temperatures >1000° C. for several hours. Secondly, a large percentage of atoms in nanocrystals are surface atoms which contribute to nonradiative recombination; in spite of this, the luminescent efficiency is high in these nanocrystals and this efficiency is increasing with decreasing size of the nanocrystals.

Three critical deductions can be made from the PLE and PL measurements shown in FIG. 2: (i) The fact that the peak of the PLE corresponds to the band gap of the ZnS nanocrystal, it establishes that the impurity is part of ZnS lattice [8]; Combining EXAFS [10] and other measurements we can determine the site symmetry of the impurity within the host lattice; (ii) The PLE spectra allows us to study the contribution of different size nanoparticles. As shown in FIG. 3 the smallest particles possess the highest efficiency; (iii) In spite of the fact we have always a wide distribution of particle sizes and associated variation of the energy band gap, yet we do not observe a wide variation in the spectral characteristics of the impurity related luminescence. This is because the luminescent spectra in rare-earths are associated with the internal atomic like transitions.

The spectral features of $Tm^{3+}$(blue), $Tb^{3+}$(Green) and $Eu^{3+}$(red) are well known as shown in FIG. 1. We have produced $Tb^{3+}$ doped nanocrystals of ZnS in a polyethylene oxide matrix and the spectral features are given in FIG. 5, which shows the PL and PLE spectra of nanocrystals of ZnS:$Tb^{3+}$ embedded in polyethylene oxide. The shift of the band gap corresponds to about 60 Å particle size. The spectra of FIG. 2 establishes that Mn-ion is an integral part of the ZnS nanocrystal. The measured efficiency of the Mn-yellow emission is over 20% and strongly depends on the size of the nanocrystals (FIG. 3). As the size of nanocrystal decreases, the probability of electron and hole capture to the impurity increases and the e-h localization enhances the recombination rate via the impurity. Besides the enhanced recombination rate which was measured at less than 20 psec [8], the nanocrystals yield very high luminescent efficiency over 20% at room temperature. This is accompanied by simultaneous reduction in the radiative life time of Mn-ion emission.

The unique properties of doped nanocrystals can lead to many important laser applications such as compact and efficient UV/visible lasers under optical and electron beam pumping.

FIGS. 10–13 illustrate schematically suitable geometries of laser devices in accordance with the invention. In these embodiments, the active layer in which the lasing action takes place is one or more thin layers of DNC particles, each preferably between 100 and 1000 Å thin, though the invention is not limited to this film geometry of the active laser structure.

Figure 10:
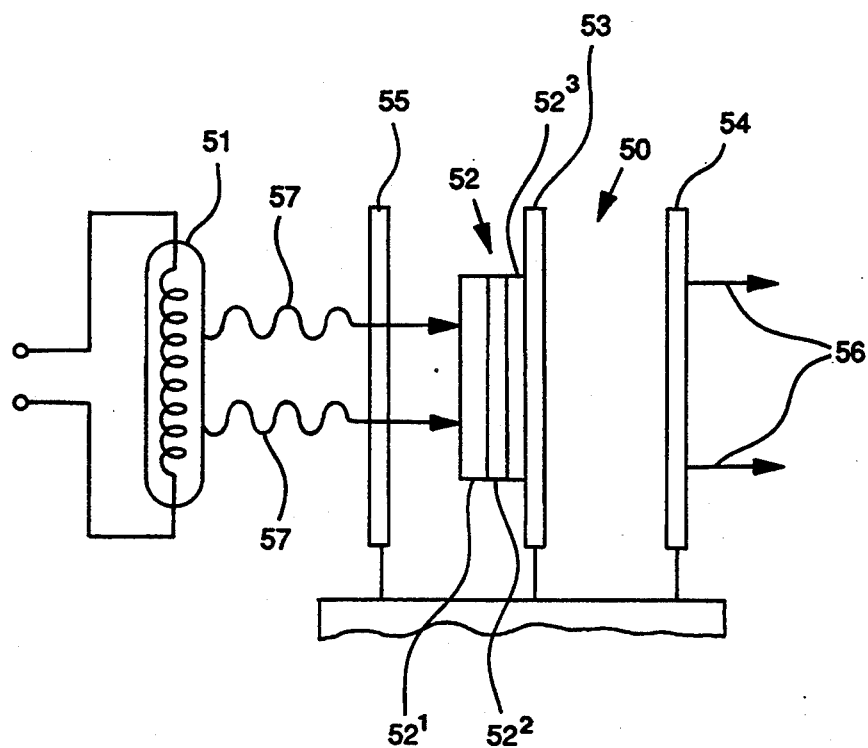
FIG. 10 schematically illustrates one form of optically-pumped laser containing a DNC phosphor layer in accordance with the invention.

In the FIG. 10 embodiment, which is an optically-pumped, solid-state laser 50, the optical pumping is provided by a conventional flashlamp 51 positioned to illuminate three superimposed DNC layers 52 on a substrate 53. Two mirrors 54, 55 provide an optical cavity for the assembly. In the usual way, the mirror 54 is slightly transparent (~1%) to allow part of the laser radiation established between the mirrors to exit as an output beam 56. The other mirror is 100% reflective to radiation impinging on its right side and transparent to radiation impinging on its left side. Thus the flashlamp radiation 57 can pass through the one-way mirror 55 but the laser oscillations are contained within the cavity formed by the two mirrors. As indicated in FIGS. 8 and 9, the pump light absorbed in the three DNC layers 52 excites carriers into excited states of the host material, whose energy is then transferred to the activator states, and due to the combined processes of trapping and decay causes stimulated emission from the activator ions which is built up by the cavity into an output laser beam 56.

The flashlamp that pumps the laser structure according to the invention can be the same high pressure gas discharge lamps used to pump prior art solid state lasers. In addition, however, because of the improved absorption efficiency, smaller output lamps can be substituted, such as a low pressure gas discharge lamp, for pumping the laser according to the invention.

One of the features of the invention is the ability to tailor the absorption of the active laser structure to substantially match the spectrum of the pumping source. The high pressure gas discharge lamp was preferred in the prior art because of its narrower spectrum distribution. The low pressure gas discharge lamp, in contrast, produces a much wider emission bandwidth. In those applications where the pumping source is of the broad spectrum type, it is preferred that multiple layers of the DNC particles is employed, as illustrated in FIG. 10. In this case, where the pumping source is a low pressure gas discharge lamp, it is preferred that the first layer $52^1$ is constituted of relatively small sizes of the DNC particles with the result that their bandgap is larger thereby lowering the absorption edge and rendering the layer more absorptive of the longer wavelength radiation. The second layer, $52^2$, preferably is constituted of DNC particles of a somewhat larger size, with the result that the second layer will be more absorptive of shorter wavelength radiation. Finally, the innermost, third layer $52^3$ should have the largest particle sizes and thus will have an absorption edge at the shortest wavelengths (which tend to penetrate deeper). In this way, more of the energy of the incident pumping radiation will be absorbed thereby improving the absorption efficiency of the system. The same concept was applied in the first referenced related application, Ser. No. 08/185,191, whose contents are specifically incorporated herein by reference. While different host materials can be employed, to take advantage of their different absorption edges, this is not necessary. The same host material can be employed and the different absorption properties desired realized by the appropriate choice of particle size for the DNC particles. And, in the latter case, the activator would be the same in all of the particles present in the active structure to obtain the same output radiation wavelength. An example of a 4-layer system emitting in the UV range is four layers of ZnS, each doped with Ce, with the DNC particle sizes from the outer to the innermost layer varying from 20 to 33 to 50 to 60 Å, producing corresponding bandgaps of 4.5, 4.1, 3.8, and 3.7 eV, respectively. It will, of course, be understood that the laser device according to the invention can also be realized with fewer or a greater number of active DNC layers. Thus, the number of DNC layers will be 1 or higher.

Figure 14:
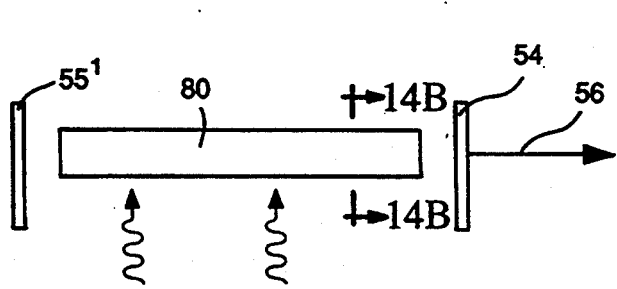
FIGS. 14A and 14B are plan schematic and cross-sectional views, respectively, of another form of laser according to the invention.
Figure 14:
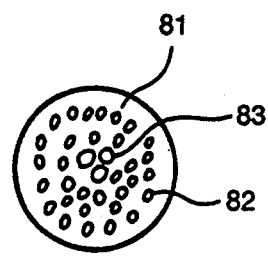

The laser of the invention is not limited to a layer structure in planar form, though this structure is the easiest to implement. Rod-like structures are also usable in the invention. In a preferred embodiment, illustrated in FIGS. 14A and 14B, the DNC particles are embedded in a transparent matrix configured in a cylindrical rod form 80. For example, the transparent matrix 81 may be a low-melting point glass in which the DNC particles are embedded. The construction described above of a gradient of DNC particle sizes can also be applied in this configuration to achieve the benefits of increased absorption of pumping energy from a broad bandwidth pumping source. In the latter case, the particle sizes would be distributed radially within the cylindrical matrix, with the smallest particle sizes 82 (largest bandgap and longest wavelength absorption) on the periphery, and with the largest particle sizes 83 (smallest bandgap and shortest wavelength absorption) in the interior.

Since it is desired to confine the laser radiation to the active structure, whether layered or rod-like, which includes not only cylindrical shapes but also rectangular solids, if desired films of materials having a lower index of refraction than that of the DNC materials can be provided on the lateral surfaces of the active structure to provide the usual waveguide effect by total internal reflection of the output radiations. In all the structures shown here and in the other figures, the substrate supports extending parallel to the lasing radiation direction are preferably constituted of a lower index material for the same confinement effect.

Figure 11:
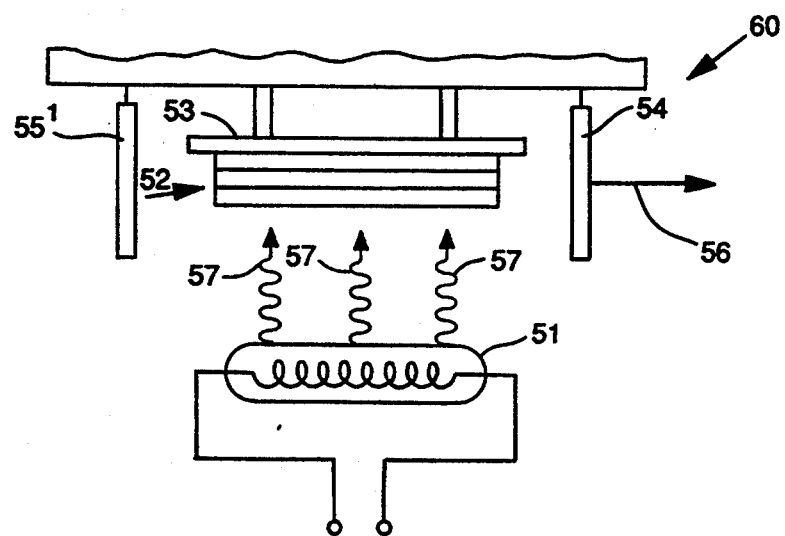
FIG. 11 schematically illustrates another form of optically-pumped laser in accordance with the invention.

FIG. 11 is an optically-pumped laser similar to that of FIG. 10 except that the flashlamp illumination is incident from a position between the cavity forming mirrors. Thus the mirror 55' need not be one-way as in the FIG. 10 embodiment. Otherwise, the FIG. 11 embodiment operates in the same manner as that of the FIG. 10 embodiment.

Figure 12:
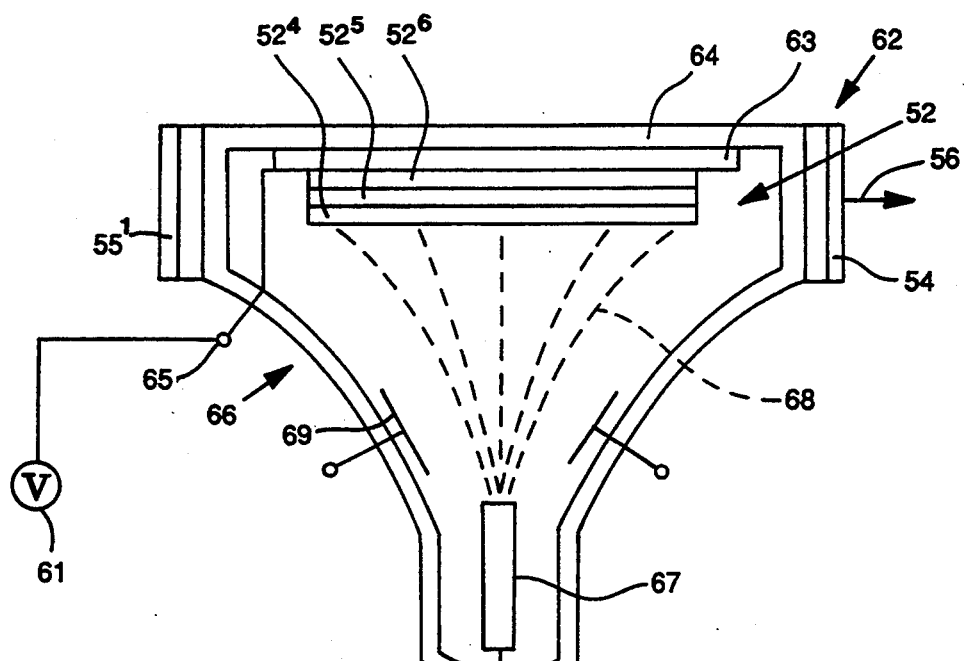
FIG. 12 schematically illustrates one form of electron-beam-pumped solid-state laser in accordance with the invention.

FIG. 12 illustrates an electron-beam-pumped solid-state laser 62. In this case, the active DNC layers 52 are supported on an electrically conductive substrate (for charge dissipation) in turn deposited on the faceplate 64 of a CRT 66 provided with an electron gun 67 to generate an electron beam 68 and deflection plates 69 to cause the beam to impact over the whole area of the DNC layers 52. The mirrors 54 and 55' form the optical cavity for the light generated by the DNC layers upon being pumped by the electron beam. This embodiment otherwise operates the same as the previous two embodiments.

Figure 13:
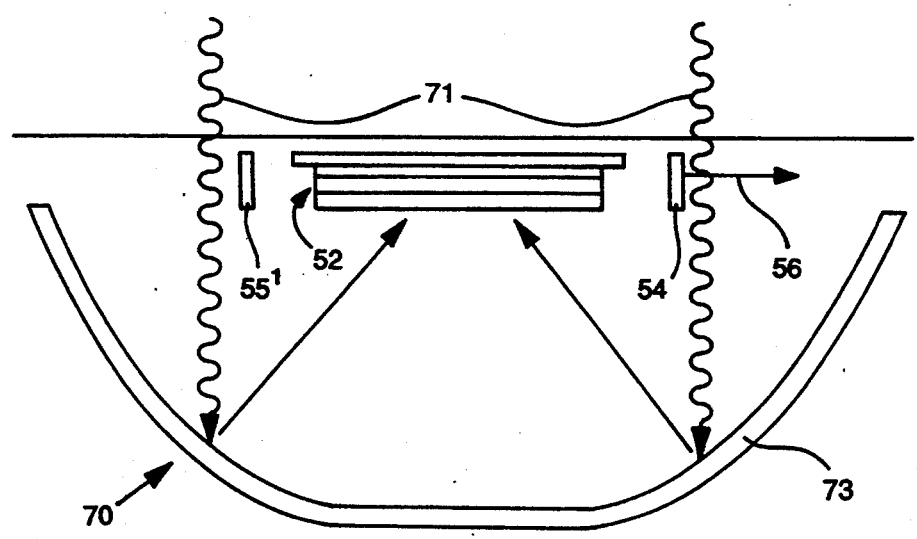
FIG. 13 schematically illustrates one form of solar-pumped solid-state laser in accordance with the invention.

The multiple DNC layers of this FIG. 12 embodiment offer the additional advantage of providing voltage-dependent laser outputs. This takes advantage of the fact that the accelerating voltage applied to the screen support 63, shown at 65, determines the depth of penetration of the electron beam into the multiple DNC layers. Thus, at a relatively low accelerating voltage, the electron will only penetrate the outer layer $52^4$; at an intermediate accelerating voltage, the electrons will penetrate to the middle DNC layer $52^5$, whereas with the highest accelerating voltage, the electrons will penetrate through the outer two layers and reach the innermost layer $5^{26}$. By choosing the activators in the three DNC layers to generate different wavelengths, such as, from FIG. 1, Tm for blue, Tb for green, and Eu for red, the output lasing radiation can be differently colored as a function of the accelerating voltage. This makes available a multi-colored lasing output under control of the user. The voltage can be controlled by a user or automatically by varying the accelerating voltage 61 applied to the screen via terminal 65. FIG. 13 illustrates a solar-pumped solid-state laser 70 of the invention. In this case, the solar radiation 71 is collected by a an optical collector 73 and focussed onto the DNC layers 52 positioned between the mirrors 54, 55' forming the optical cavity. Otherwise, the operation is similar to that of the FIG. 11 embodiment. As explained above, to make more efficient use of the broad spectrum of the solar radiation, it is preferred that multiple DNC layers are provided, preferably with different hosts in the order of increasing energy of absorption edge (from the layer closest to the incident radiation to further layers), and with different particle sizes from small to large distributed in the same direction. As shown in FIGS. 4 and 5 of the first referenced related application, the host order could be, for example, small particle size ZnS DNC, followed by intermediate particle size ZnSe DNC, and large particle size CdS DNC, which would cover the wavelength range of far ultra-violet (UV) through yellow. Alternatively, without varying the particle sizes, and with just the different hosts listed, absorption in the range of 4-2.5 eV would be obtained. If the layers were all doped with Tb, all layers would emit in green.

The lifetime of lasing transition have been measured to be of the order of a few tens of nanoseconds, the recombination time is about 1 ns, while the energy transfer time is only a few picoseconds. The optical system will be capable of increasing the sunlight flux density by a factor of M=1,000. Thus, the saturation power density is of the order of $10^{23}$ photons per square centimeter, and the material actually never gets saturated, an important advantage of the use of the DNC particles as the active lasing structure. In general, to obtain this important result that will allow one to pump to higher and higher intensities without saturation of the lasing material, reference being had to FIGS. 6 and 8, the necessary conditions to be satisfied are that $t_R$ must be much shorter—preferably at least one order of magnitude shorter—than $t_{NR}$, and shorter than $t_D$, with the result as explained above that the excited carriers will decay along the path leading primarily to radiative transitions and population inversion.

In order to evaluate the gain, the precise value of the stimulated emission cross-section is necessary. That value can be determined from absorption and lumenescence measurements. For order-of-magnitude calculations, it is assumed to be roughly $10^{19}$ cm$^2$—a value in line with the measurements for most solid state laser materials based on the rare-earth or transition-metal ions. In reality, the emission cross-section is probably enhanced due to the confinement-driven hybridization as proven by the luminescence lifetime shortening experiments. With the data at my disposal I, nevertheless, can estimate that a gain of the order of 1 cm$^{-1}$ will be achieved if the solar radiation collected by a 0.25 m$^2$ reflector is dumped into a 1X1X.2 mm laser structure. This is enough to achieve lasing.

DNC phosphor layers are readily prepared in conventional ways. For example, the nanocrystalline powders made as described above can be suspended in polyvinyl alcohol and ammonium dichromate solution and applied as a coating to a suitable support, using conventional coating techniques, such as spin-coating, or aerosol-spray. A thin conducting overcoating can be applied to prevent charging under an electron beam. A layer thickness below 1000 A is preferred. In the case of the CRT, the support could be a glass faceplate. For the other displays, the support would be the substrate shown.

It will also be understood that the invention is not limited to the optical geometry illustrated in connection with the solar-pumped embodiment, and any of the well-known solar radiation collectors and concentrators can be substituted such as, for example, that disclosed in reference 3], whose contents are herein incorporated by reference. Similarly, the geometries illustrated for the other optical-pumped embodiments can also be substituted by other well-known optical geometries.

While the invention has been described in connection with preferred embodiments, it will be understood that modifications thereof within the principles outlined above will be evident to those skilled in the art and thus the invention is not limited to the preferred embodiments but is intended to encompass such modifications.

APPENDIX

References

[1] C. G. Young, Appl. Opt., 5, 993 (1966)

[2] N. A. Kozlov, A. A. Mak, B. M. Sedov, Sov. J. Opt. Techn., 33, 549 (1966)

[3] J. Falk, L. Huff, J. P. Taynai,"Solar-pumped, mode-locked, frequency doubled Nd:Yag laser", Conf. on Laser Eng. and Appl., Washington, DC (1975)

[4] D. Pruss, G. Huber, A. Beimowski, Appl. Phys. B 28, 355 (1982)

[5] R. N. Bhargava, D. Gallagher, X. Hong, and A. Nurmikko; Phys. Rev. Lett. 72,416 (1994).

[6] R. N. Bhargava, D. Gallagher, and T. Welker; J. of Luminescence (accepted).

[7] D. Gallagher, R. N. Bhargava, J. Racz, and W. Heady; J. of Crystal Growth (accepted).

[8] P. Klein, T. Norris, R. N. Bhargava and D. Gallagher (to be published).

[9] L. Brus, J. Phys. Chem. 90. 2555 (1986)

[10] J. Soo, Y. H. Kao, R. N. Bhargava and D. Gallagher (to be published).

[11] R. C. Ropp, "Luminescence And The Solid State", Publ. Elsevier, New York, 1991, Ch. 9, Pgs. 361-411.

[12] P. A. Biaconi. J. Lin, and A. R. Strzelecki, Nature, Vol. 349, P. 315, (1991).

What is claimed is:

1. A solid-state laser comprising:
   (a) a layer of doped nanocrystal (DNC) particles doped with an activator,
   (b) said DNCs having an energy band structure with a conduction band containing first energy levels due to quantum confinement,
   (c) said activator having second atomic energy levels overlapping with the first energy levels, whereby excited carriers can transfer between said first and second energy levels, said activator also having third atomic energy levels located below in energy the second energy levels and allowing easy transition between the second and third energy levels, transitions in said activator band structure between said third energy level and a ground state being radiative and generating photons,
   (d) means for exciting carriers in the DNCs into its first energy levels allowing transfer of excited carriers to the second or third energy levels followed by their slower radiative transition to the ground state, (e) optical cavity means for the DNCs to enable build-up of the photon density and laser action.

2. The laser of claim 1, wherein the means for exciting carriers comprises optical or electron-beam pumping means.

3. The laser of claim 2, wherein the DNCs are less than 100 A in size.

4. The laser of claim 1, wherein the DNCs comprise a metal oxide or solid state laser host material.

5. The laser of claim 1, wherein the DNCs comprise a II-VI host material with an activator emitting in the UV or visible range.

6. The laser of claim 5, wherein the activator is a rare earth or transition metal ion.

7. A solid-state laser comprising:
(a) a body of doped nanocrystals (DNC) doped with activator ions,
(b) said DNC having an energy band structure with a conduction band containing discrete first energy levels due to quantum confinement,
(c) said activator ions having discrete atomic second energy levels at least one of which is substantially near or at least one of the first energy levels whereby resonant energy transfer of excited carriers can occur at very high speeds between said first and second energy levels, said activator ions also having third atomic energy levels located below in energy the second energy levels and allowing easy transition of excited carriers between the second and third energy levels, carrier transitions in said activator energy levels between said third energy level and a ground state being radiative and being substantially slower than the speed of the carrier transitions from said second to said third energy levels,
(d) means for exciting carriers in the DNC into the first energy levels whereby the resonant energy transfer of excited electrons to the second or third energy levels followed by their slower radiative transition to the ground state causes electron population inversion in the third state and a large output of photons characteristic of the carrier transition to the ground state when the carriers radiatively transit to the ground state,
(e) optical cavity means for the DNC body to enable build-up of the photon density and laser action.

8. The laser of claim 7, wherein the means for exciting carriers comprises means for producing an electron beam.

9. The laser of claim 7, wherein said optical cavity comprises a slightly light transparent first mirror and a second mirror, and the means for exciting electrons comprises means for generating an electron beam capable of penetrating the DNC body.

10. The laser of claim 9, wherein the body comprises regions in the direction of the electron beam of increasing particle size of the DNC.

11. The laser of claim 10, further comprising means for accelerating the electron beam to different values to cause the beam to penetrate to different distances in the DNC body and excite carriers in the different DNC particle sizes.

12. The laser of claim 7, wherein the means for exciting carriers comprises means for producing pumping light.

13. The laser of claim 12, wherein the means for producing pumping light comprises a lamp.

14. The laser of claim 7, wherein the means for exciting carriers comprises a low pressure gas discharge tube.

15. A solid-state laser comprising:
(a) an optical cavity,
(b) within the optical cavity a layer of doped nanocrystal (DNC) particles,
(b) said DNC particles comprising a host material having an energy band structure with a conduction band with first energy levels in the conduction band,
(c) activator elements in said host material, said activator elements having energy levels with second energy levels,
(d) said DNC particles having a size such that said first energy levels and said second energy levels lie within approximately 1 kT of energy of each other thereby allowing a resonant energy transfer of excited electrons from the first to the second energy levels, said excited electrons in the energy levels of the activator elements undergoing transitions at a first speed to a lower level, said excited electrons in the lower level of the conduction band of the activator elements undergoing at a second speed to a ground level radiative transitions that generate photons, said first speed being at least one order of magnitude faster than the second speed whereby a population inversion of excited electrons builds up in the excited energy levels of the activator elements,
(e) means for exciting electrons in the host material into its conduction band, whereby laser action results from the build up of photon generation within the optical cavity.

16. A solid-state laser comprising:
(a) an optical cavity,
(b) within the optical cavity a body of doped nanocrystal (DNC) particles,
(b) said DNC particles comprising a host material having an energy band structure with a conduction band with first energy levels in the conduction band,
(c) activator elements in said host material, said activator elements having split second energy levels,
(d) said DNC particles being sized such that the first energy levels of the host are substantially at the same energy level as that of one or more of the split second energy levels in the energy level structure of the DNC whereby resonant energy transfer can occur at very high speeds between said first and second energy levels, said activator also having third energy levels located below in energy the second energy levels thereby allowing easy transition between the second and third energy levels, transitions in said activator level structure between said third energy level and a ground state being radiative and being substantially slower than the speed of the resonant energy transfer,
(e) means for exciting electrons in the DNC into its first energy levels whereby the fast resonant energy transfer of excited electrons to the second energy levels followed by their slower radiative transition to the ground state causes electron population inversion in the third state and a large output of photons characteristic of the transition to the ground state when the electrons radiatively transit to the ground state, (f) optical cavity means for the DNC layer to enable build-up of the photon density and laser action.

17. The laser of claim 16, wherein the means for exciting electrons comprises a low pressure gas discharge tube.

18. The laser of claim 16, wherein the host compound is an insulating or solid-state lasing material.

19. The laser of claim 16, wherein the host compound is a II–VI compound.

20. The laser of claim 19, wherein the dopant is a rare earth element.

21. The laser of claim 20, wherein the rare-earth element is selected from the group consisting of Tm, Tb, and Eu.

22. The laser of claim 16, wherein the host compound is a line-emitting phosphor with a rare earth dopant.

23. The display device of claim 16, wherein the particle size is between about 2–5 nm.

24. The laser of claim 16, wherein the phosphor material is in the form of a layer of 1000 A or less.

25. The laser of claim 16, wherein the body is composed of a distribution of DNC particles of different host materials.

26. The laser of claim 16, wherein the body is composed of a distribution of DNC particles with different activators.

27. The laser of claim 16, wherein the body is composed of a distribution of DNC particles of different particle sizes.

28. The laser of claim 16, wherein the body is composed of a distribution of DNC particles such that the wavelength spectrum of the means for exciting electrons substantially matches the absorption spectrum of the body.

* * * * *